J. J. JUDGE.
DIRECTION SIGNAL FOR MOTOR VEHICLES.
APPLICATION FILED APR. 18, 1921.
1,407,199.
Patented Feb. 21, 1922.
2 SHEETS—SHEET 2.
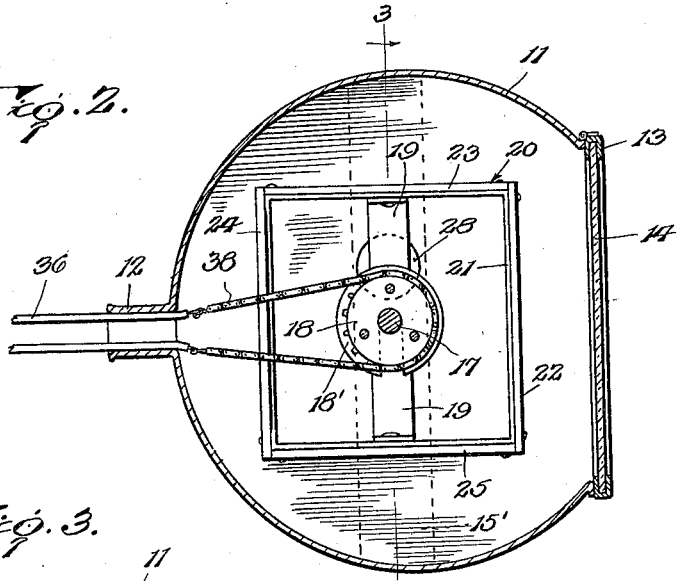
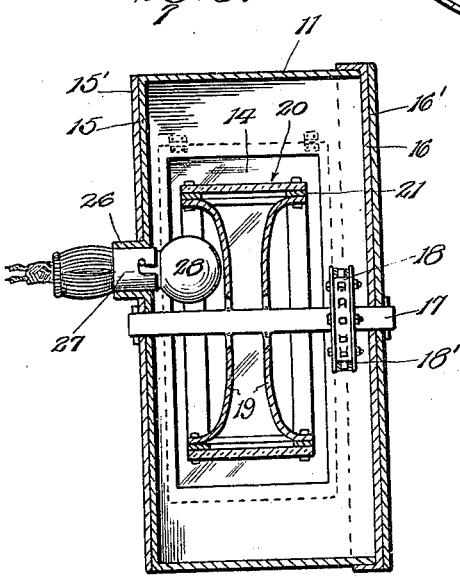
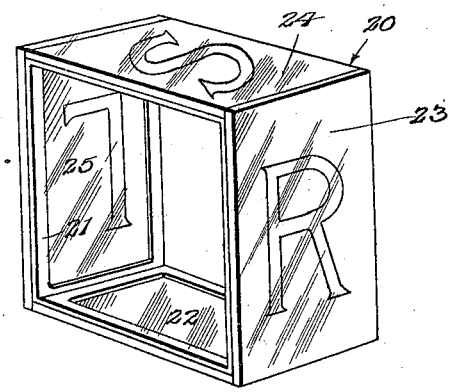
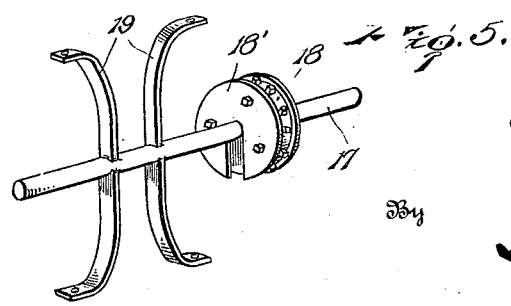
Inventor
John J. Judge.
By Lacey & Lacey, Attorneys

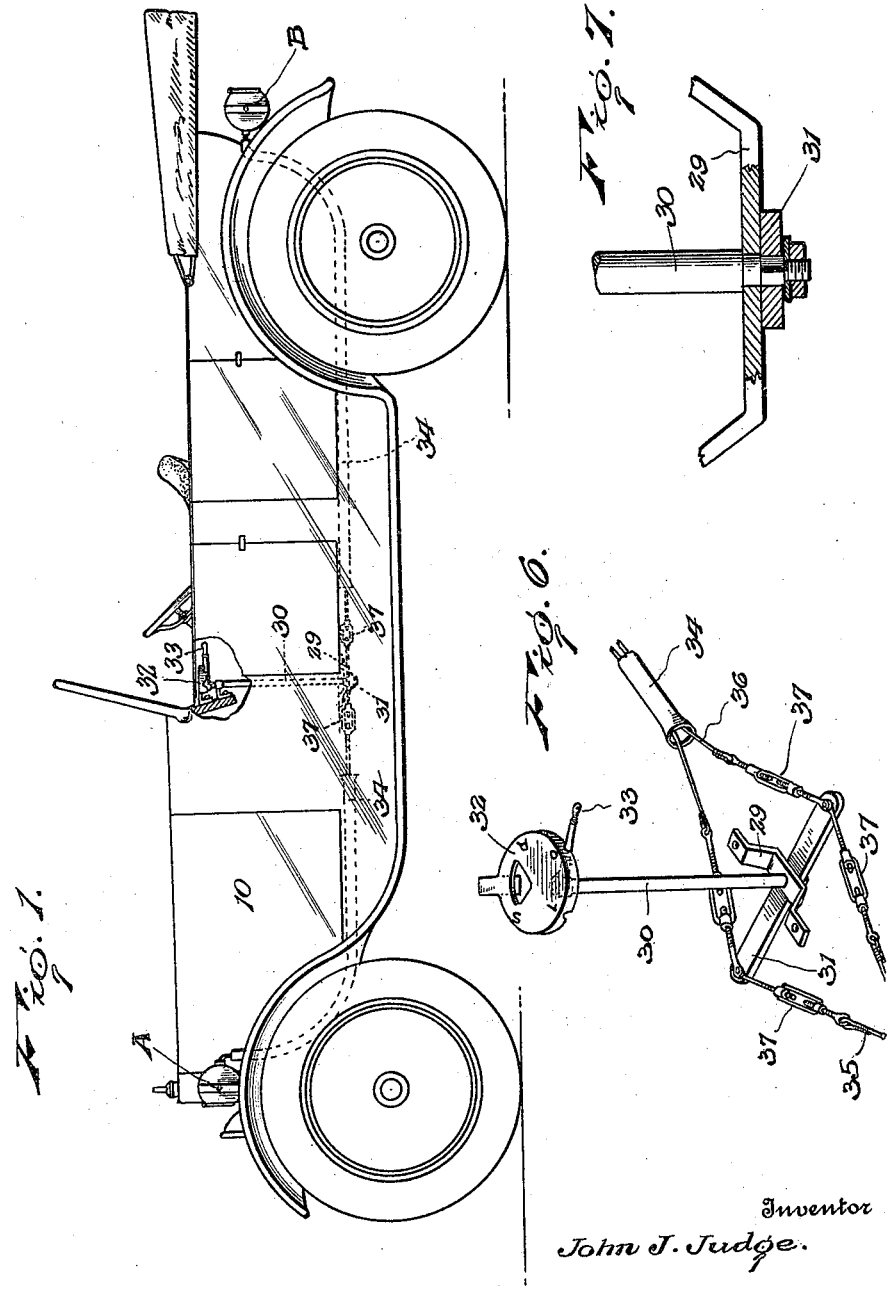

UNITED STATES PATENT OFFICE.

JOHN J. JUDGE, OF JESSUP, PENNSYLVANIA.

DIRECTION SIGNAL FOR MOTOR VEHICLES.

1,407,199.  Specification of Letters Patent.  Patented Feb. 21, 1922.

Application filed April 18, 1921. Serial No. 462,088.

*To all whom it may concern:*

Be it known that I, JOHN J. JUDGE, citizen of the United States, residing at Jessup, in the county of Lackawanna and State of Pennsylvania, have invented certain new and useful Improvements in Direction Signals for Motor Vehicles, of which the following is a specification.

This invention relates to an improved direction signal for motor vehicles and has as one of its principal objects to provide an efficient device of this character whereby the operator of a vehicle may signal an intention to turn either to the right or left or to stop.

The invention has as a further object to provide a device employing companion signaling members one located at the front of the vehicle and the other located at the rear thereof, the two members being simultaneously operable by a suitable mechanism convenient to the driver of the vehicle so that the driver may display a signal at the front and rear of the vehicle coincidently.

And the invention has as a still further object to provide a signal which may be readily employed in connection with motor vehicles of substantially any conventional design.

Other and incidental objects will appear hereinafter.

In the drawings:

Figure 1 is a side elevation showing my improved signal in connection with a motor vehicle of conventional design, Figure 2 is a sectional view taken through one of the signaling members, Figure 3 is a transverse section on the line 3—3 of Figure 2, looking in the direction of the arrows, Figure 4 is a detail perspective view of the signal drum of said member, Figure 5 is a detail perspective view showing the supporting shaft for said drum, Figure 6 is a detail perspective view showing the control mechanism for the signaling members, and Figure 7 is a fragmentary elevation partly broken away and illustrated in section to show the mounting of the control shaft.

Referring now more particularly to the drawings, I have, for convenience, shown my improved signal in connection with a motor vehicle 10 of conventional design. As will be seen, companion signaling members A and B are employed, the signaling member A being mounted near the front of the vehicle and the signaling member B being mounted near the rear thereof. These signaling members are identical in construction and accordingly, only one will be described in detail. As shown in Figures 2 to 5 inclusive, each of said signaling members includes a casing 11 of sheet metal or other approved material and said casing is provided at its rear side with a guide tube 12 while at the forward side of the casing is a door 13 carrying a suitable sight window 14. As best shown in Figure 3, the casing is provided with an integral side wall 15 and a removable side wall 16 in the nature of a flanged cap and the wall 15 is braced by a reinforcing strip 15′ while the wall 16 is braced by a similar reinforcing strip 16′. Journaled through the side walls and their bracing strips is a cross shaft 17 near one end of which is a sprocket 18 having removable slotted side plates 18′ and extending from said shaft medially thereof are confronting spokes 19, it being noted that the shaft, the sprocket and said spokes are an integral structure. Carried by the spokes is a rectangular signaling drum 20 comprising a suitable frame 21 to which the spokes are secured and appropriately mounted upon said frame are side panels 22, 23, 24 and 25 respectively, these panels being of glass or other approved material. The panel 22 is blank, the panel 23 carries the signal sign R, the panel 24 the signal sign S while upon the panel 25 is imposed the signal sign L, these letters indicating right, stop and left respectively. The side wall 15 is provided at a point above the shaft 17 with a nipple 26 in which is fixed an appropriate electric light socket 27 and removably mounted in said socket is an electric lamp 28. By bowing the spokes 19 of the signaling drum, these spokes are not only strengthened but also, clearance is provided for the lamp 28.

Coming now to the control mechanism employed, I provide a bracket 29 which is suitably mounted beneath the vehicle in advance of the driver's seat and journaled upon this bracket is an upstanding shaft or post 30 to the lower end of which is fixed, as shown in Figure 7, an arm 31. Secured to the instrument board of the vehicle at the upper end of said post is a segment 32 and fixed to the post to cooperate with said segment is a lever 33. Extending forwardly and rearwardly beneath the vehicle from points adjacent the post 30 to points near the signaling members A and B are conduits 34 and slidable through said conduits are pairs of wires 35 and 36 respectively, turnbuckles 37 being employed in conjunction with the wires so that the effective length thereof may be adjusted. Trained around the sprockets 18 of the signaling members are sprocket chains 38 and, as will be readily understood, the wires 35 are connected to the ends of the chain of the member A while the wires 36 are connected to the ends of the chain of the member B, the wires extending into the casings 11 of said members through the guide tubes 12.

Normally, the drums 20 of the signaling members A and B stand with the blank panels 22 disposed opposite the sight windows 14 so that, as will now be readily understood in view of the preceding description, the lever 33 may be swung for simultaneously rotating said drums to display the signal sign R, to display the signal sign L, or to display the signal sign S at each of said windows. As shown in Figure 6, the segment 32 is preferably provided with notches to accommodate the lever 33 in each of the positions of the drums and is also preferably provided with suitable indicia identifying the several positions of the lever. Suitable wires are led from the lamp sockets 27 of the signaling members to the battery or other suitable source of electrical energy upon the vehicle so that at night said members may be illuminated. I accordingly provide a particularly effective device for the purpose set forth and one which will tend to greatly lessen the dangers incident to motor traffic.

Having thus described the invention, what is claimed as new is:

1. A direction signal including a casing having side walls and provided with a sight window, one of said side walls being removable, a shaft journaled through the side walls, means associated with the shaft securing the removable side wall in position, spokes extending from the shaft, a drum carried by said spokes and provided with signal signs, and means for rotating the shaft to selectively dispose said signal signs opposite said sight window.

2. A direction signal including a casing having a sight window, a rotatable shaft carried by the casing provided with a sprocket and having spokes extending therefrom, a drum carried by said spokes and provided with signal signs, and a sprocket chain trained around said sprocket for rotating the shaft to selectively dispose said signal signs opposite the sight window.

3. A direction signal including a casing, having a sight opening, a rotatable shaft carried by the casing provided with an integral sprocket and with spokes, slotted side plates secured to the sides of the sprocket, a drum carried by said spokes and provided with signal signs, and a sprocket chain trained around said sprocket for rotating the shaft to selectively dispose said signal signs opposite the sight window.

4. A direction signal including a casing, a rotatable shaft carried thereby and provided with spokes, a drum carried by said spokes and provided with signal signs, means for rotating the shaft to selectively dispose said signal signs opposite the sight window, and a lamp mounted within the casing, the spokes being bowed to provide clearance for said lamp.

5. A direction signal including a casing having a sight window, a rotatable shaft carried by the casing and provided with a sprocket, side plates removably secured to the sides of the sprocket, a drum carried by said shaft and provided with a signal sign, and a sprocket chain trained around said sprocket for rotating the shaft to dispose the signal sign opposite the sight window.

In testimony whereof I affix my signature.

JOHN J. JUDGE. [L. S.]